March 22, 1932. G A. LUTZ 1,850,803
METHOD OF AND MEANS FOR MAKING CONDUIT OUTLETS
Filed Sept. 2, 1930 5 Sheets-Sheet 3
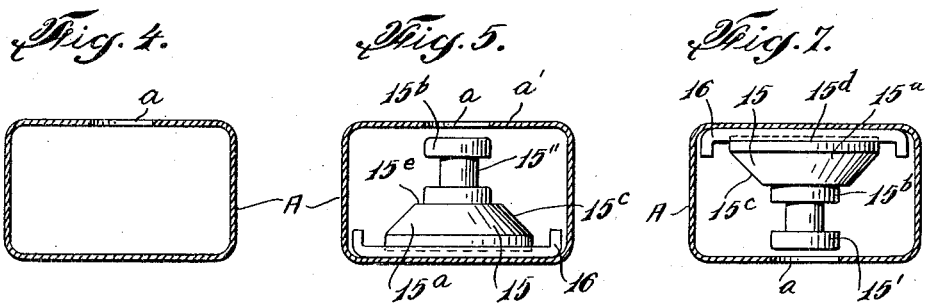
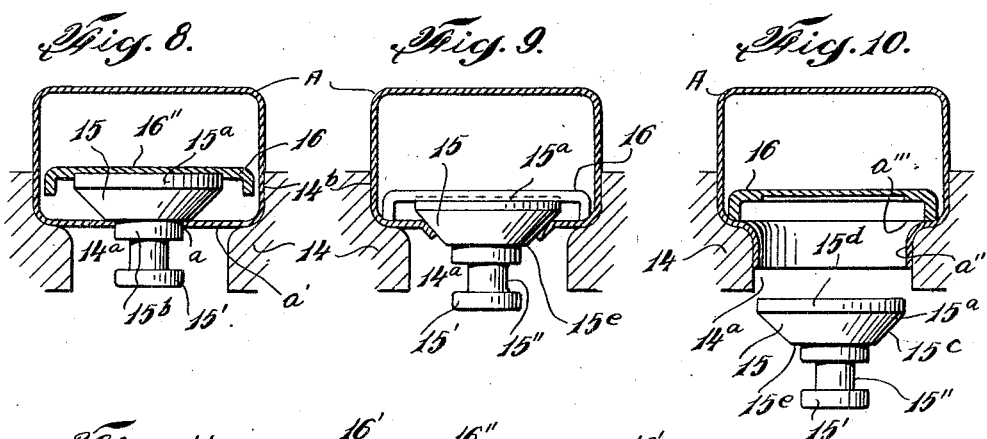
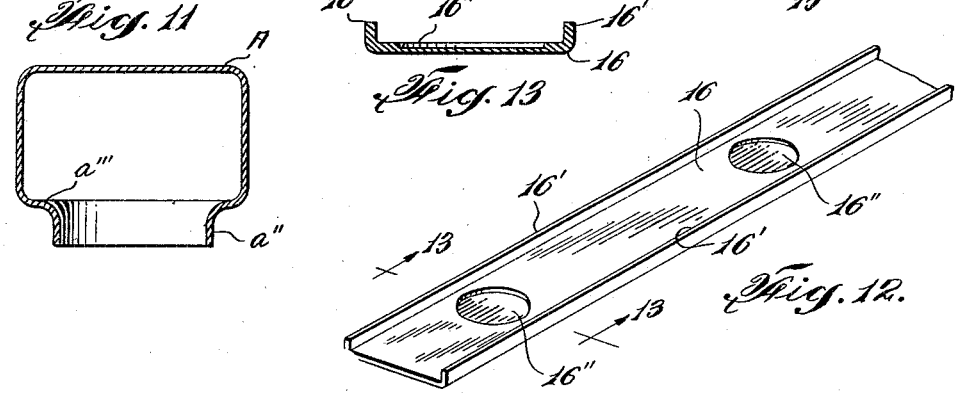
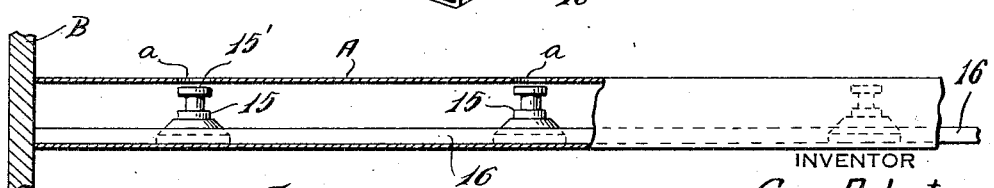
INVENTOR
Geo. A. Lutz.
BY
T. F. Bourne
ATTORNEY

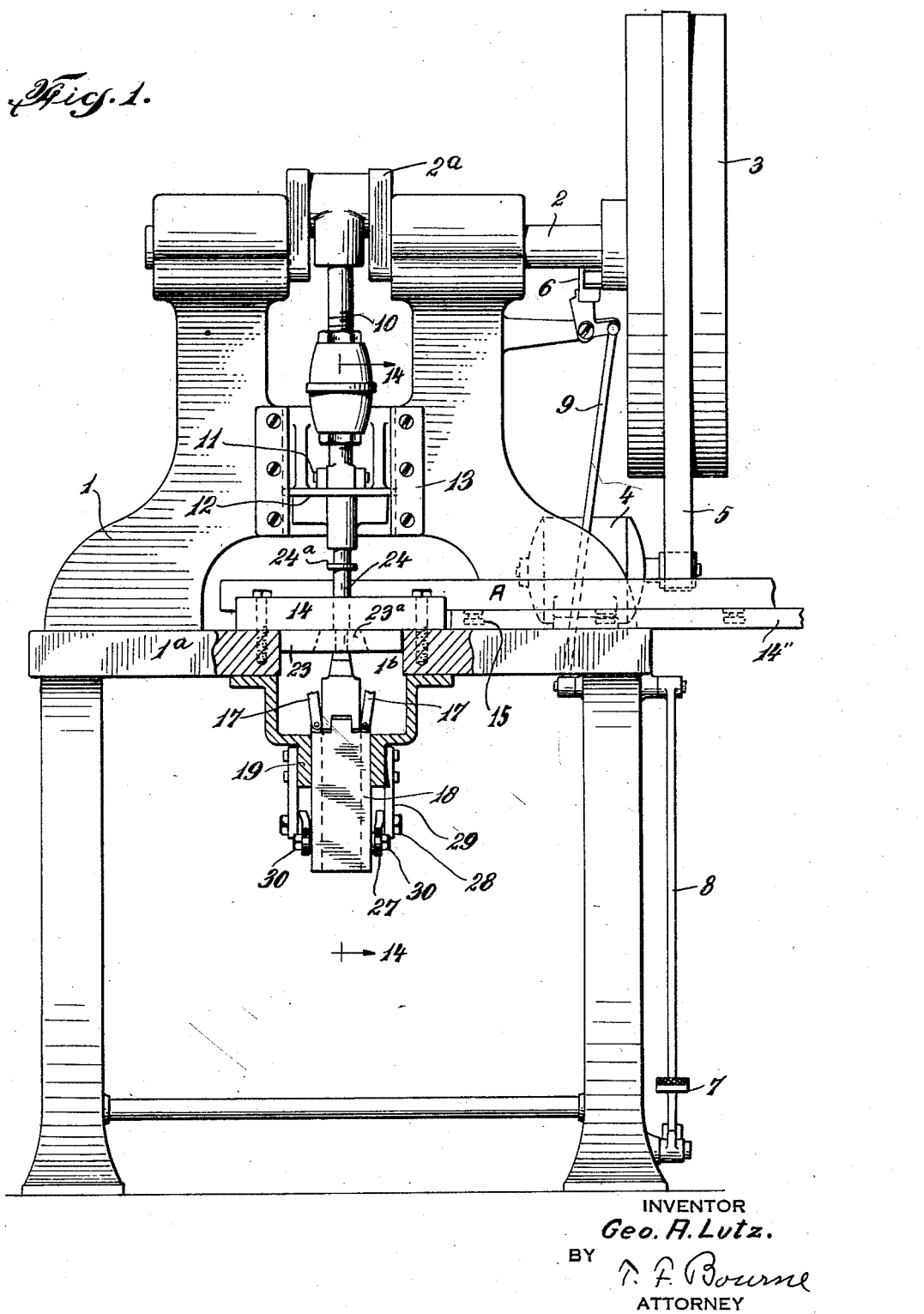

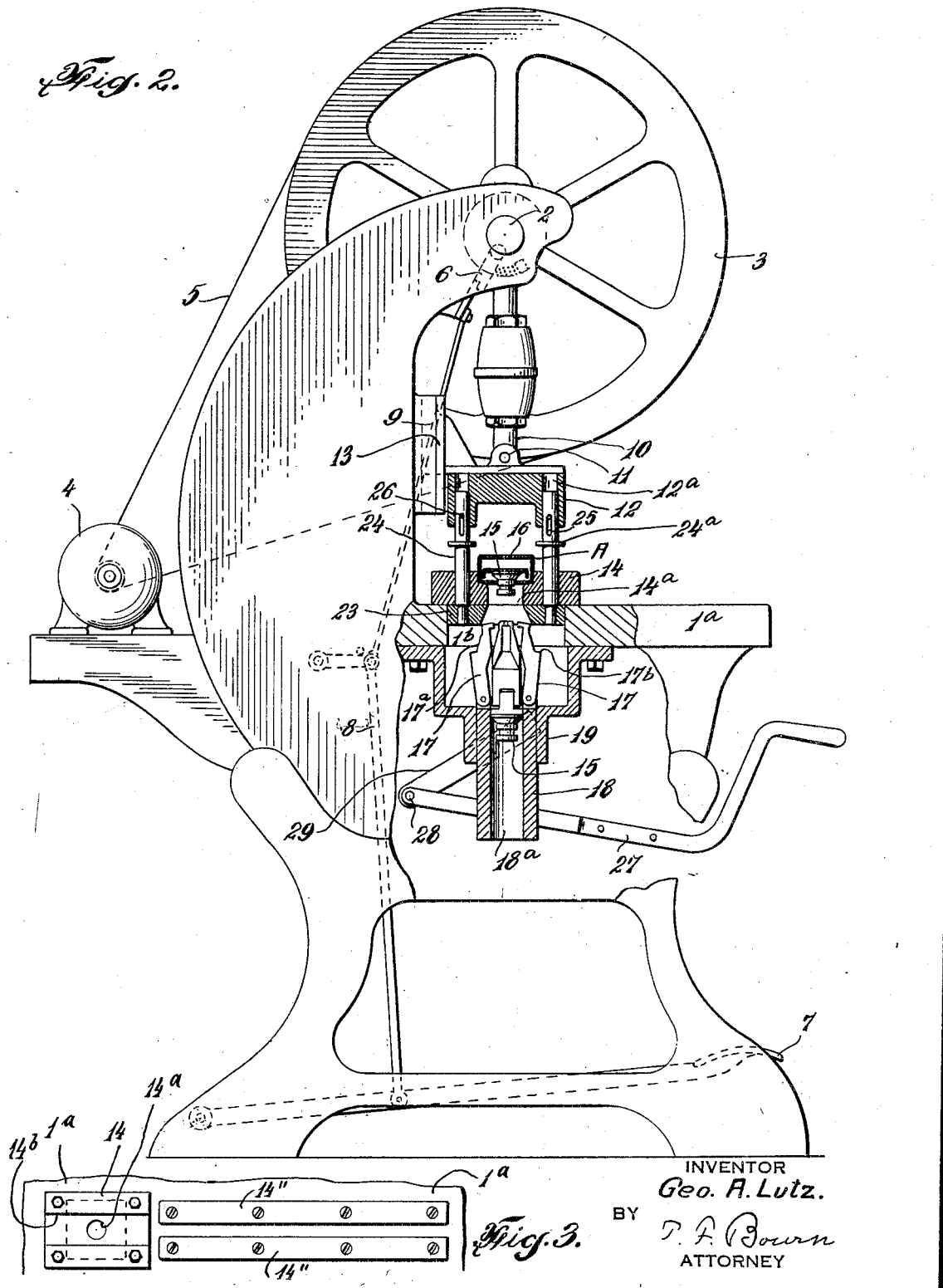

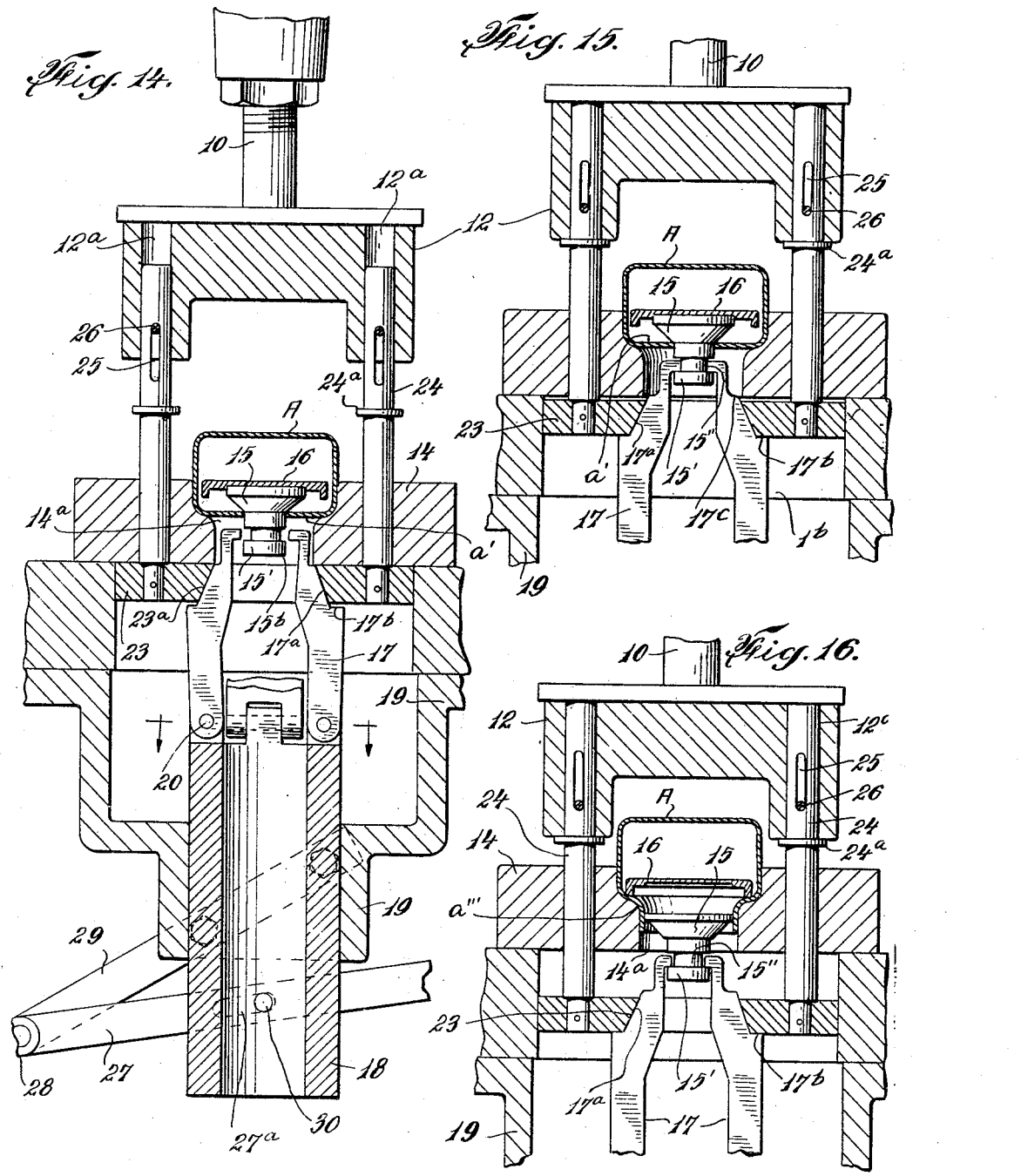

March 22, 1932. G. A. LUTZ 1,850,803
METHOD OF AND MEANS FOR MAKING CONDUIT OUTLETS
Filed Sept. 2, 1930 5 Sheets-Sheet 5
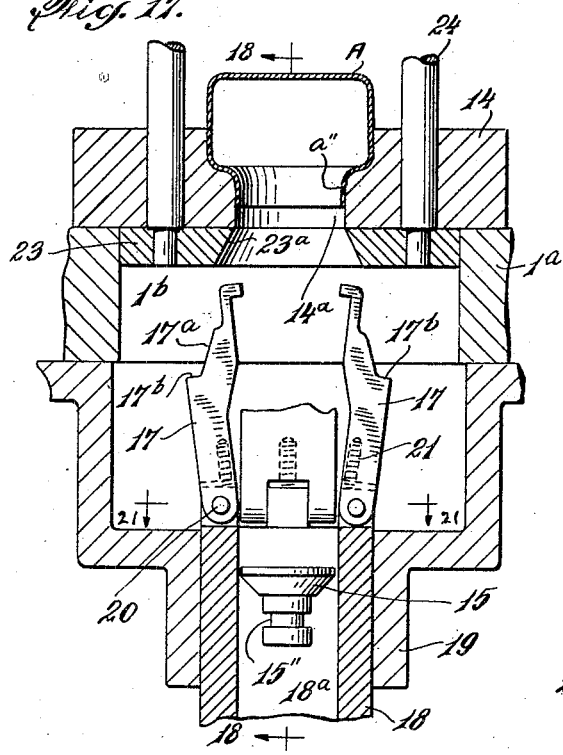
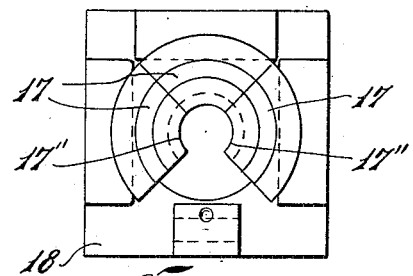
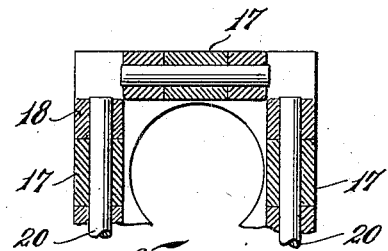
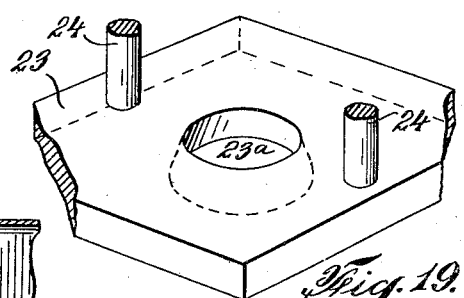
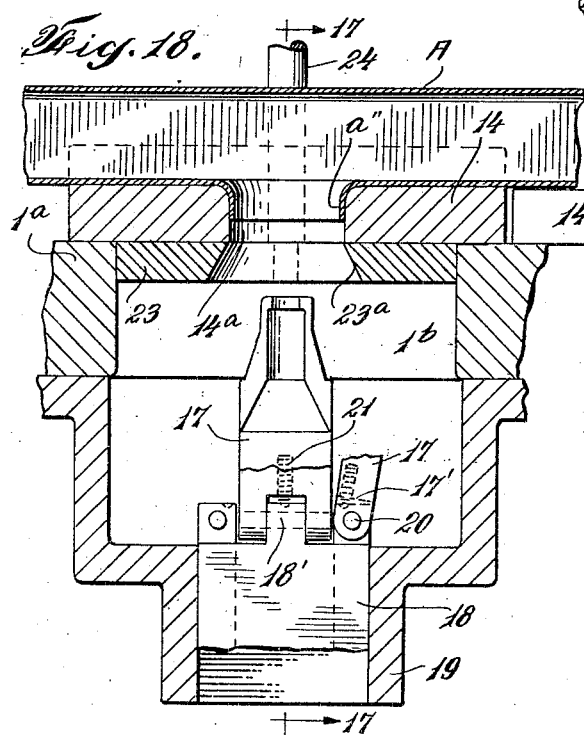
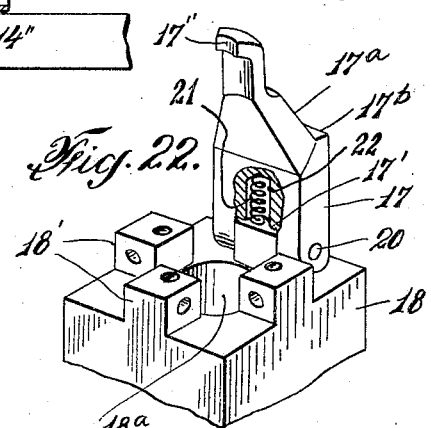
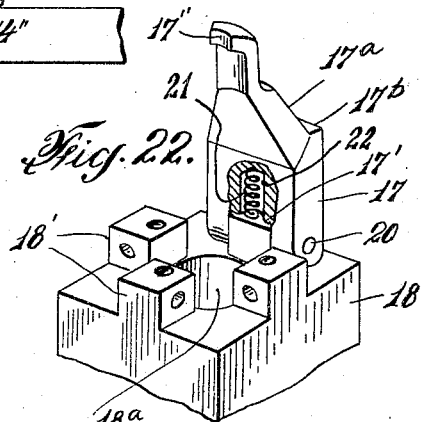
INVENTOR
Geo. A. Lutz.
BY P. F. Bourne
ATTORNEY Patented Mar. 22, 1932

1,850,803

UNITED STATES PATENT OFFICE

GEORGE A. LUTZ, OF CRANFORD, NEW JERSEY, ASSIGNOR TO NATIONAL ELECTRIC PRODUCTS CORPORATION, OF PITTSBURGH, PENNSYLVANIA, A CORPORATION OF DELAWARE

METHOD OF AND MEANS FOR MAKING CONDUIT OUTLETS

Application filed September 2, 1930. Serial No. 479,254.

My invention has reference to the production of tubular outlets or projections drawn integrally from the metal of conduits or ducts, such as those adapted to the so-called underfloor conduit systems, and in other relations, to contain electrical conductors.

One of the objects of my invention is to produce tubular outlets or projections, from a wall of a conduit or duct, by pulling plugs or male die members from the inside of a conduit through a wall of the latter to draw the metal of said wall outwardly.

Another object of my invention is to provide a machine by means of which plugs or male die members partially projecting through a wall of a conduit or duct may be successively grasped, pulled through said wall to produce the aforesaid outlets or projections in tubular form, and be dropped free from the conduit, as the conduit is fed through the machine.

In carrying out my invention I provide a conduit or duct with any desired number of spaced holes or apertures in a wall thereof, insert suitably shaped plugs or male die members within the conduit with portions of said plugs projecting through said holes, pull said plugs through said holes or apertures and thereby cause the metal surrounding said holes to be drawn outwardly in tubular form for the production of the aforesaid tubular outlets or projections integral with said wall.

My improved machine comprises a female die or guide for the conduit having an opening to receive the plugs or male die members that project from the conduit, means to grip the projecting portions of said plugs or members, and means to operate said gripping means to grip said plugs or members, pull them through the holes in the conduit, and release said plugs, whereby each time that a plug or die member is pulled through a hole in a wall of the conduit a tubular outlet or projection thereon will be produced.

My invention also comprises novel details of improvement that will be more fully hereinafter set forth and then pointed out in the claims.

Reference is to be had to the accompanying drawings, wherein

Fig. 1 is a partly sectional front elevation of a machine embodying my invention, by means of which my improvements may be carried out; Fig. 2 is a partly sectional side elevation of Fig. 1; Fig. 3 is a detail plan view of guide 14 and guide rails 14" of Fig. 1; Fig. 4 is a cross-section of a conduit to be provided with tubular outlets or projections; Figs. 5, 6, 7 and 8 are detail sections illustrating steps preparatory to pulling the plugs or male die members through the conduit walls; Figs. 9 and 10 are detail cross-sections illustrating steps in pulling the plugs or die members through the conduit wall; Fig. 11 is a cross-section of the conduit illustrating a tubular outlet or projection thereon; Fig. 12 is a detail perspective of a portion of a jig for positioning several plugs or die members with respect to the holes or openings in the conduit wall; Fig. 13 is a section on line 13—13 in Fig. 12; Figs. 14, 15 and 16 are sectional details illustrating successive positions of parts for pulling the plugs or die members through the conduit wall; Fig. 17 is a section on line 17—17 in Fig. 18, illustrating the plug-releasing position of the plug-pulling jaws or fingers; Fig. 18 is a section on line 18—18 in Fig. 17; Fig. 19 is a detail perspective of the jaw-operating member; Fig. 20 is a plan view of the plug-gripping jaws or fingers; Fig. 21 is a sectional detail on line 21—21 of Fig. 17; and Fig. 22 is a detail perspective of the jaw-carrying member.

Similar numerals of reference indicate corresponding parts in the several views.

The frame 1 of the machine may be of any suitable construction, being shown provided with a crank-shaft 2, having a fly wheel 3, which may be driven by an electric motor 4 and belt 5, or in any other desired way. Any well known or desired clutch means, indicated at 6, and operated by a pedal 7 and connecting means or rods 8 and 9, may be provided for causing shaft 2 to make one complete rotation and stop each time that the pedal 7 is operated, as in the nature of an ordinary punch press, Figs. 1 and 2. A connecting rod 10 is carried by crank 2ª and pivotally connected at 11 with a head 12 that reciprocates in guides 13.

At 14 is a guide and female die member for the conduit A, suitably secured on the table 1ª of frame 1, said guide being provided with die-like opening 14ª, at the bottom. Said guide has a longitudinal channel 14ᵇ, serving as a guideway, through which the conduit or duct A is slidably guided. A wall of the conduit is provided with any desired number of spaced holes $a$, according to the number or tubular outlets or projections to be produced on said wall, (Figs. 2, 4, 6 and 14). Said holes $a$ are adapted to successively register with the die-aperture 14ª, as the conduit or duct is fed through the guide 14ᵇ. At 15 are plugs or male die members adapted to project through the holes $a$ of the conduit. Said plugs or die members are shown of annular formation, and have a head portion 15ª of greater cross-section than the diameter of the holes $a$ of the conduit or duct A, said plugs also having a stem or projecting portion 15ᵇ extending from the head portion and of less diameter than said holes, so that the stems may pass freely through said holes. The head portions of the plugs 15 have a tapering or frusto-conical surface 15ᶜ beyond a circular outer surface 15ᵈ, (Figs. 4 to 10), extending toward the stem portion and larger than the holes $a$ of the conduit or duct, and at the inner end of the stem portion 15ᵇ the plugs have a shoulder at 15ᵉ that is adapted to rest against the wall $a'$ of the conduit or duct, with the projecting stem portions 15ᵇ extending through said holes, whereby the plugs are temporarily supported by said wall, as illustrated in Figs. 2, 8, 14 and 15. The stems or projecting portions 15ᵇ of the plugs have stops at 15′, which may be formed by means of annular recesses 15″ in said projections, whereby the plugs may be drawn through the wall $a'$ of the conduit at the holes $a$.

The conduit or duct A is to be fed through the guide 14 with the stem portions 15ᵇ of the plugs projecting within the holes $a$ of the conduit so that the plugs may, successively, drop into the die opening 14ª, as illustrated in Figs. 2 and 14, in position to be grasped for drawing the plugs through the holes to produce the tubular outlets or necks $a''$ on the conduit, (Figs. 10, 11, 16, 17 and 18). The conduit may rest on spaced guide rails 14‴ adjacent to the guide 14 for feeding the conduit to the said guide, with the stems of the plugs hanging between said rails, Figs. 1 and 3. As a convenient means for registering the plugs 15 in spaced relation within the conduit with respect to the spaced holes $a$ thereof I provide a plug assembling jig 16, that is adapted to slidably fit within the conduit to be guided thereby. Said jig is shown provided with outturned marginal edges 16′ adapted to slide along the conduit and position the jig therein, Figs. 2, 5, 6, 12 and 13. The jig 16 is also provided with spaced seats or recesses 16″, (Figs. 5, 8, 12 and 13, within which the headed portions 15ª of the plugs may be seated, in the position of the parts shown in Figs. 5 and 6. When the plugs 15 are to be inserted within the conduit they are placed in the seats 16″ of jig 16, and said jig, with said plugs in position, is slid endwise into the conduit A with the plug stems extending upwardly, the conduit being positioned with its holes $a$ extending upwardly, the conduit and the jig both being brought to bear against a stop B, to cause the plugs 15 to register with the holes $a$ above the plugs, (Figs. 5 and 6). The conduit is next inverted or turned on its longitudinal axis to reverse the position of the holes $a$, so that they will extend downwardly, as illustrated in Fig. 7, whereupon the plugs will advance toward said holes and the projecting stem portions 15ᵇ of the plugs will advance through said holes, so that the shoulders 15ᵉ of said plugs will rest against the wall $a'$ with said stems projecting through said holes, Figs. 2 and 8.

To pull the plugs 15 through the holes $a$ of the conduit for production of the tubular outlets or necks $a''$ on the conduit at the holes $a$ I provide means described as follows:—at 17 are a plurality of annularly disposed plug-gripping jaws or fingers that are pivotally carried at the upper end of a slidable tubular member 18 in register with the openings 23ª and 14ª. The member 18 is shown of rectangular cross-section and guided to reciprocate in a rectangular guideway 19, depending from table 1ª of frame 1. The jaws or fingers 17 are shown pivotally attached to member 18 by means of pins 20 that pass through the lower ends of said jaws and through projections 18′ upstanding from member 18 and entering recesses 17′ in the lower ends of jaws 17 (Figs. 21 and 22). Springs 21 within recesses 22 in the lower ends of the jaws bear against the bottoms of the recesses and against the tops of the adjacent projections 18′, tending to normally move said jaws outwardly, engagement of the bottoms of said recesses 17′ with the tops of said projections limiting the outward movement of the jaw, (Figs. 18 and 22). Four jaws or fingers 17 are illustrated, arranged in a circle, the upper reduced ends of said jaws, at the inner surfaces, being shown inwardly curved at 17″ to enter the recess 15″ of a plug 15 and to engage the stop 15′ to draw or pull the plug through the conduit wall, (Figs. 15, 16 and 22). The outer upper portions of the jaws 17 are provided with tapering or inclined cam-like surfaces 17ª, and with stops or shoulders 17ᵇ below said surfaces. A reciprocative block or plate 23, shown as rectangular, is slidably guided in a corresponding guide opening 1ᵇ in the table 1ª which block or plate is provided with an opening 23ª receiving the upper portions of the jaws 17. The opening 23ª is shown downwardly tapering at its outer wall, substantially corresponding to the inclination of the surfaces 17ª of the jaws 17, and said opening is of such diameter that the lower face of the block 23 surrounding the opening 23ª will engage the shoulders or stops 17ᵇ of the jaws 17, when the block 23 is pushed downwardly, (Figs. 14 and 15). The block or plate 23 is to be reciprocated by the crank 2ª, for which purpose rods 24 are attached to and extend upwardly from said block, on opposite sides of the guide 14, and are operatively connected with the reciprocative head 12, (Figs. 2, 14, 15 and 16). To provide for the desired action of the clutch means 6 the rods 24 are slidably guided in bores 12ª in the head 12, the rods being shown provided with slots 25 receiving pins 26 carried by said head, to permit relative movement between the rods and the head and retain them operatively together. The rods 24 are shown provided with stops 24ª to be engaged by the head 12 for forcing said rods, and thereby the plate or block 23, downwardly for drawing a plug from the conduit or duct A. The slots 25 and pins 26 provide a lost motion and cooperate with head 12 for raising the plate or block 23 at the proper time. The jaws 17 are to be pushed down by the block 23 free from the guide 14, when a plug is drawn through the conduit wall, and said jaws are to be pushed upwardly to engage a succeeding plug. I have shown a hand operative lever 27 pivotally supported at 28 on brackets or arms 29 secured to the guideway 19, the lever being shown provided with slot 27ª receiving pin 30 from the slidable member 18, (Figs. 1, 2 and 14). Each time the lever 27 is raised the jaws 17 will be advanced to a plug.

The operation is as follows:—

A conduit or duct A, having the desired number of holes $a$ spaced along a wall $a'$, is placed in the position shown in Figs. 4, 5 and 6, with the said wall and holes uppermost, and the jig 16, having the plugs 15 resting on their heads in the spaced recesses 16″, is slid into the conduit with the plug stems extending upwardly, the jig and the conduit being brought to rest against the stop B, to register the plugs within the conduit with the holes $a$, as illustrated in Figs. 5 and 6. The conduit is next reversed in position, or turned at an angle of 180°, as illustrated in Fig. 7, whereupon the plugs will drop partially through the holes $a$ in wall $a'$, and will rest at their shoulders 15ᵉ against said wall, with the projecting stem portions of the plugs protruding through said holes, the jig 16 resting upon the plugs, as shown in Fig. 8. With the conduit charged with the plugs, with their stems hanging downwardly, one end of the conduit is entered in the guideway 14 and may be slid along the latter until the first plug stem enters the die opening 14ª, in the position shown in Figs. 2, 8, 14 and 15, the block 23 at such time being in the elevated position, and the jaws 17 depressed, as shown in Fig. 2. The operative will next raise the lever 27, whereupon the jaws 17 will rise into the opening 23ª in plate 23 and the upper ends of said jaws will engage the tapering wall of said opening, causing the jaws to approach until their surfaces 17ª engage the said wall, the jaws being brought to rest with a space at $b$ between the shoulders 17ᵇ of the jaws and the block 23, as illustrated in Fig. 14, and the upper ends 17″ of the jaws will be in register with the recesses 15″ of the plugs. The lever 27 will be temporarily retained by the operative who will next operate the pedal 7 to actuate the clutch 6. Since the shaft 2 is to continuously rotate (during operations) the crank 2ª will depress the head 12 which will descend and push the rods 24, whereupon the plate or block 23 will be pushed downwardly, from the position shown in Fig. 14. The initial downward movement of plate 23, by engaging the surfaces 17ª of the jaws 17, will cause said jaws to advance toward the plug 15, then hanging with its projecting stem between the jaws, whereupon the upper ends of the jaws will enter the recess 15″ of the plug and the block 23 will engage the shoulders 17ᵇ of the jaws, as shown in Fig. 15, the upper ends of the jaws engaging the stops 15′. Continued downward movement of the block or plate 23 retains the jaws against the stem of the plug and said plate by bearing against the shoulders 17ᵇ of the jaws 17, will cause said jaws to descend, whereupon the plug 15 will be drawn through the hole $a$ of the conduit wall, in the nature of a male die member, and the tubular projection, outlet or neck $a''$ will be drawn from the wall $a'$ of the conduit or duct, as illustrated in Figs. 9, 10, 11 and 16. The upper portion of the opening 14ª in the member 14 has a suitable curvature, or a desired radius, so that when the wall $a'$ around the hole $a$ of the conduit is drawn into said opening 14ª the projection or neck $a''$ of the conduit will have a suitable radius at $a'''$, (Figs. 10, 11 and 16). After the plate 23 reaches the bottom of its stroke it will rise, leaving the jaws 17 and their member 18 and lever 27 depressed, as in Figs. 2 and 17, whereupon the springs 21 will cause said jaws to spread apart to release the plug 15, which will fall through the bore 18ª of the member 18. When the plate 23 reaches the upper end of its stroke the clutch 6 will release the shaft 2 and the parts will come to rest. The conduit will next be slid through the guideway 14 for the succeeding plug 15 to enter the opening 14ª, whereupon the operative will operate the pedal 7 and the operations before described will be repeated with respect to said plug to draw another tubular projection or neck $a''$ from the wall of the conduit, and so on for as many holes $a$ as are originally provided in the wall $a'$.

By means of my invention I am enabled to expeditiously and accurately draw any desired number of spaced tubular projections, outlets or necks on a conduit wall integrally therewith, as well as a single one thereof, without danger of fracture of the metal of said wall and with great economy.

Having now described my invention what I claim is:—

1. The method of producing a tubular projection on a conduit wall, consisting in producing spaced holes in the wall, inserting plugs within the conduit and causing said plugs to project from said holes, successively grasping the projecting portions of said plugs and drawing the latter through said holes and causing the metal of the wall around the holes to be drawn outwardly.

2. The method of producing a tubular projection on a conduit wall, consisting in producing a hole in the wall, placing the conduit in position with said wall and hole extending upwardly, inserting a plug into the conduit with a projecting portion of the plug extending upwardly in register with said hole, inverting the conduit and plug simultaneously together to cause the plug to advance partially through the hole and rest against said wall, and drawing said plug through said hole and causing the metal of the wall around the hole to be drawn outwardly.

3. The method of producing tubular projections in spaced relation on a conduit wall, consisting in producing spaced holes in the wall, placing the conduit in position with said wall and holes extending upwardly, inserting a jig having spaced plugs thereon into said conduit, registering the plugs with the holes, inverting the conduit with the plugs and jig therein to cause portions of the plugs to advance through the holes with the plugs resting against the wall and the jig on the plugs, and successively drawing said plugs through said holes and causing the metal of the wall around the holes to be drawn outwardly in tubular form.

4. A plug of the character described having a head portion and a stem portion extending therefrom, the head portion having a reduced surface extending toward the stem portion, the plug having a portion to rest against a wall, the stem portion having means to be engaged for drawing the plug through said wall.

5. A plug as set forth in claim 4, provided with a circular outer surface adjacent to the reduced portion.

6. A plug of the character described having a head portion and a stem portion extending therefrom, the head portion having a reduced surface extending toward the stem portion, the plug having a shoulder to rest against a wall, the stem portion having a stop to be engaged to draw the plug through said wall.

7. A plug as set forth in claim 6, in which the stem portion is provided with a recess adjacent to said stop.

8. A metal drawing machine comprising a die member having an opening for plugs, means to guide a conduit with a plug projecting therefrom at said opening, devices to engage a portion of said plug projecting from said conduit, and means to actuate said devices to draw the plug through a wall of said conduit.

9. A machine as set forth in claim 8, in which said devices include jaws, and means to cause them to engage and release said plug.

10. A metal drawing machine comprising a die member having an opening for plugs, means to guide a conduit with a plug projecting therefrom at said opening, jaws to engage a portion of said plug projecting from the conduit, means to move the jaws into operative relation to said plug outside of the conduit, and means to cause the jaws to engage the plug and draw it through a wall of said conduit.

11. A machine as set forth in claim 10, in which the means to move the jaws includes a reciprocative member to which the jaws are pivoted, and means to actuate said member.

12. A machine as set forth in claim 10, in which the means to cause the jaws to engage the plug include a plate having an opening to receive the jaws, and means to operate the plate to push and release the jaws.

13. A metal drawing machine comprising a die member having an opening for plugs, means to guide a conduit at said opening, jaws to engage the plug, means to operate the jaws to position them with respect to the plug, a plate having an opening to receive said jaws, said opening and said jaws having cooperative surfaces to cause the jaws to approach the plug, and means to reciprocate said plate to cause the jaws to engage and draw the plug through a wall of the conduit and to release said jaws.

14. A machine as set forth in claim 13, in which the jaws and the opening in said plate have cooperative inclined surfaces to engage during a movement if the plate in one direction to cause the jaws to approach the plug and to draw the plug through said wall and to release the jaws when the plate moves reversely.

15. A machine as set forth in claim 13, in which the jaws have shoulders to be engaged by the plate, said surfaces positioning said shoulders at a distance from the plate when the jaws are positioned with respect to the plate, whereby the plate may initially move to move the jaws into operative relation to the plug and may engage said shoulders to move the jaws to draw the plug through a wall of the conduit.

16. A metal drawing machine comprising a die member having an opening for plugs, means to guide a conduit at said opening, jaws to engage a plug projecting from the conduit, a reciprocative tubular member in register with said opening, the jaws being pivotally carried by said member, means to move the jaws into operative relation to said plug, and means to actuate said jaws to grasp the plug and draw it through a wall of the conduit, said means being movable to release the jaws from the plug to cause the latter to pass through said tubular member.

17. A metal drawing machine comprising a die member and guiding means for a conduit, the die member having an opening for a plug projecting from the conduit, jaws to grasp the plug, means to move the jaws into operative relation to the plug, a plate having an opening to receive the jaws, a reciprocative head connected with the plate, and means to move said head toward and from the die member to actuate the plate to cause the jaws to draw the plug through a wall of the conduit and release the plug.

18. A machine as set forth in claim 17, in which the head and the plate are operatively connected by rods, and means to permit the rods to have lmited movement relatively to the head.

19. A machine as set forth in claim 17, in which the head and the plate are operatively connected by rods, the head and the rods having pin and slot connections to permit limited relative movement of the head and rods.

20. A machine as set forth in claim 17, in which the head and plate are operatively connected by rods, and means to permit the rods to have limited movement relatively to the head, the rods being provided with stops to be engaged by the head to actuate the plate.

21. A metal drawing machine comprising a die member for a conduit having means to permit a plug to project from the conduit, jaws to engage the plug, a reciprocative member pivotally carrying the jaws, a lever operatively connected with the member to locate the jaws in operative relation to the plug, and means to engage the jaws to cause them to grasp the plug and draw it through a wall of the conduit.

22. A machine as set forth in claim 21, in which the member is provided with projections at its upper end, the jaws being pivotally connected to said projections.

23. A machine as set forth in claim 21, in which the member is provided with projections at its upper end, the jaws being pivotally connected to said projections, and springs operatively connected with said jaws to normally spread them to release the plug.

24. A metal drawing machine comprising a die member for a conduit having means to permit a plug to project from the conduit, a reciprocative member, a plurality of jaws pivotally carried in a circular relation by said member to engage the plug, means to operate said member to present the jaws in operative relation to the plug, and means to move said jaws into grasping relation to the plug and to draw the plug through a wall of the conduit.

GEORGE A. LUTZ.